United States Patent [19]

Blomberg et al.

[11] Patent Number: 5,644,676
[45] Date of Patent: Jul. 1, 1997

[54] THERMAL RADIANT SOURCE WITH FILAMENT ENCAPSULATED IN PROTECTIVE FILM

[75] Inventors: Martti Blomberg, Vantaa; Markku Orpana, Espoo; Ari Lehto, Helsinki; Hannu Kattelus, Vantaa, all of Finland

[73] Assignees: Instrumentarium Oy; Vaisala Oy, both of Helsinki, Finland

[21] Appl. No.: 494,636

[22] Filed: Jun. 23, 1995

[30] Foreign Application Priority Data

Jun. 23, 1994 [FI] Finland .................................. 943037

[51] Int. Cl.$^6$ ............................................. H01K 7/00
[52] U.S. Cl. .................... 392/407; 219/553; 219/544; 338/308; 338/262; 313/578; 313/522; 356/352
[58] Field of Search ........................... 392/407; 219/552, 219/553, 544, 543; 338/306–309, 262; 73/204.26; 356/352; 313/522, 578; 250/504 R

[56] References Cited

U.S. PATENT DOCUMENTS

| 4,315,968 | 2/1982 | Suplinskas et al. ............. 428/367 |
| 4,352,006 | 9/1982 | Zega ............................. 219/543 |
| 4,501,144 | 2/1985 | Higashi et al. ............. 73/204.26 |
| 4,682,503 | 6/1987 | Higashi et al. ............. 73/204.26 |
| 4,706,061 | 11/1987 | Johnson . |
| 4,724,356 | 2/1988 | Daehler ....................... 250/504 R |
| 4,902,138 | 2/1990 | Goeldner et al. . |
| 5,021,711 | 6/1991 | Madden et al. . |
| 5,068,517 | 11/1991 | Tsuyuki et al. ............... 219/543 |
| 5,285,131 | 2/1994 | Muller et al. . |
| 5,408,319 | 4/1995 | Halbout et al. ............... 356/352 |
| 5,464,966 | 11/1995 | Gaitan et al. ................. 219/544 |
| 5,500,569 | 3/1996 | Blomberg et al. ............. 313/578 |

FOREIGN PATENT DOCUMENTS 0125859  11/1984  European Pat. Off. .

OTHER PUBLICATIONS

Laser Focus World, vol. 28, No. 12, Dec. 1, 1992, pp. 26, 28, 31, "Hot–filament microlamps now feasible," Eugene D. Jungbluth.
Bross, et al, "Modular Resistor Array", IBM Tech. Disclosure, vol. 13, No. 5, Oct. 1970.

Primary Examiner—John A. Jeffery

[57] ABSTRACT

An electrically modulatable radiant source includes an essentially planar substrate, a well or hole formed in the substrate, and at least one incandescent filament attached to the substrate. The incandescent filament is aligned with the well or hole and is formed of a metallic compound which readily oxidizes at an operating temperature of the incandescent filament. An oxidation resistant film encapsulates the incandescent filament to prevent the filament from oxidizing. Furthermore, contact pads are formed on the substrate at both ends of the incandescent filament for feeding electric current to the incandescent filament.

25 Claims, 4 Drawing Sheets

THERMAL RADIANT SOURCE WITH FILAMENT ENCAPSULATED IN PROTECTIVE FILM

BACKGROUND OF THE INVENTION

1. Field of the Invention

The present invention relates to an electrically modulatable thermal radiant source.

2. Description of Related Art

Infrared radiant sources are used in optical analysis methods as IR radiation sources, and in some other applications as heat sources. Several different types of IR sources are used for the former application, such as the "globar" source, the incandescent lamp, and the thick-film radiator. The intensity of the radiation beam emitted by the IR source can be modulated by altering the source temperature through varying the input power to the source, or alternatively, by using a mechanical beam interrupting device called a "chopper", while simultaneously keeping the source temperature as constant as possible.

When a mechanically movable chopper is used for modulating the beam, the mean time between failure of the radiant source is usually limited by the chopper mechanism life, typically lasting from one year to two. An electrically modulated source provides a much longer time between failure.

Analogous to its name, a "globar" is a glowing bar. The bar is conventionally made from a ceramic material heated with electric current. A "globar" device is typically a few millimeters thick and a few centimeters long, whereby its thermal time constant is several seconds. The "globar" is usually not modulated by varying the power input to the device. The input power is typically in the range from a few watts to a hundred watts. A variant of the "globar" device is a ceramic bar having a resistance wire wound about the bar. The thermal properties of the variant are equivalent to those of the simple "globar".

An incandescent lamp can be electrically modulated with frequencies up to tens of Hz, even up to several hundred Hz, but the glass bulb of the lamp absorbs radiation in the infrared range and blackens in the long run, whereby the output intensity of radiation delivered by the lamp decreases with time. The required input power is typically from a few watts to tens of watts.

A thick-film radiator typically comprises a thick-film resistor formed onto an alumina substrate and heated by electric current. The size of the resistor is typically in the order of a few square millimeters and it has a thickness of half a millimeter. The thermal time constant of the resistor typically is in the order of seconds and the required power input is a few watts.

Conventional production techniques used in microelectronics and micromechanics provide the ability to produce miniature size, electrically modulated radiant sources from silicon. See, for example, 1) H. Guckel and D. W. Burns, "Integrated transducers based on black-body radiation from heated polysilicon films," Transducers '85, 364–366 (Jun. 11–14, 1985); 2) Carlos H. Mastrangelo, James Hsi-Jen Yeh, and Richard S. Muller: "Electrical and optical characteristics of vacuum sealed polysilicon microlamps," IEEE Transactions on Electron Devices, 39, 6, 1363–1375 (June 1992); and 3) M. Parameswaran, A. M. Robinson, D. L. Blackburn, M. Gaitan and J. Geist, "Micromachined thermal radiation emitter from a commercial CMOS process," IEEE Electron Device Lett., 12, 2, 57–59 (1991). Such devices have a thin-film structure of polysilicon with a typical thickness of approx. one micrometer and a length of hundreds of micrometers. The width of the thin-film resistive element may vary from a few micrometers to tens of micrometers. The thermal capacity of such a silicon incandescent filament is low permitting its modulation with frequencies up to hundreds of hertzes. Pure silicon is an inferior conductor for electric current. However, by doping it with a proper dopant such as, e.g., boron or phosphorus, excellent conductivity is attained. Boron as a dopant is handicapped by the fact that its activation level is not stable, but rather, is dependent on the earlier operating temperature of the silicon incandescent filament. This causes the activation level to continually seek a new equilibrium state, which means that the resistance of the filament drifts with time, and so does the input power to the filament unless the power input is not externally stabilized. The highest impurity concentration possible in silicon with boron as dopant is approx. $5 \cdot 10^{19}$ atoms/cm$^3$. Other conventional dopants are arsenic and antimony. A problem encountered with these elements as dopants is the difficulty of achieving adequately high impurity concentrations for attaining a sufficiently high conductivity for low-voltage use.

The incandescent filament discussed in H. Guckel and D. W. Burns, "Integrated transducers based on black-body radiation from heated polysilicon films," Transducers '85, 364–366 (Jun. 11–14, 1985) is made by doping with phosphorus to achieve a sheet resistance greater than 50 Ω/square. The incandescent filament is 100 μm long, 20 μm wide and elevated from the substrate by 1.2 μm. In such a structure, the radiant power loss over the air gap to the substrate is particularly high, and a high risk of the filament adhering to the substrate is evident as the filament sags during heating.

Both boron and phosphorus doping have a problem related to the migration of dopant atoms. This manifests itself in the form of a hot zone developing at that end of the filament wherefrom the dopant atoms have migrated away. Resultingly, the emission intensity profile of the incandescent filament undergoes a gradual change, which is observed as a long-term instability.

The structure of the incandescent filament discussed in Carlos H. Mastrangelo, James Hsi-Jen Yeh, and Richard S. Muller: "Electrical and optical characteristics of vacuum sealed polysilicon microlamps," IEEE Transactions on Electron Devices, 39, 6, 1363–1375 (June 1992) comprises encapsulation under a thin-film window and placing the incandescent filament in a vacuum to avoid burn-out. Such a window cannot be wider than a few tens of micrometers, whereby the total surface area of the filament, and accordingly, its radiant output remain small. To avoid adherence of the filament, a V-groove is etched into the substrate.

The IR emitter discussed in M. Parameswaran, A. M. Robinson, D. L. Blackburn, M. Gaitan and J. Geist, "Micromachined thermal radiation emitter from a commercial CMOS process," IEEE Electron Device Lett., 12, 2, 57–59 (1991) has a size of 100 μm by 100 μm and uses two meandering polysilicon resistors as the heating element. Such a structure is prone to warp during heating, and large-area emitting elements cannot be manufactured by way of this concept. Though the heating element is continuous, the gas bubbles emerging during the etching phase of the substrate cause no problems as the heating element size is small in comparison with the openings about it. However, the temperature distribution pattern of this structure is not particularly good as is evident from FIG. 2 of the Parameswaran et al. article.

An incandescent filament made from doped polysilicon is associated with a characteristic temperature above which the temperature coefficient of the filament resistance turns negative, that is, allows the filament to pass more current with rising temperature. Consequently, such a component cannot be controlled by voltage, but rather, by current. Neither can such filaments be connected directly in parallel to increase the radiant source surface as the current tends to concentrate on that filament having the lowest resistance, that is, the highest temperature. Series connection on the other hand requires elevating the input voltage to a multiple of the single filament voltage. Boron doping cannot provide a satisfactorily high characteristic temperature, because a high boron impurity concentration only achieves a characteristic temperature of approx. 600° C. If the operating temperature of the filament is higher than this, the filament resistance tends to drift with time.

In the embodiment according to Semiconductor International, p. 17, November 1992, the incandescent filament is made of a thin-film metallic layer. To prevent oxidization, the incandescent filament is encapsulated in a vacuum.

SUMMARY OF THE PRESENT INVENTION

It is an object of the present invention to overcome the disadvantages of the above-described prior-art techniques and to achieve an entirely novel electrically modulatable thermal radiant source.

The goal of the invention is accomplished by making the incandescent filaments from a metal such as tungsten, titanium-tungsten alloy or molybdenium, after which the filament is entirely coated with a thin film of oxidization-resistant material such as silicon nitride, for instance.

The approach according to the invention requires no vacuum encapsulation about the incandescent filaments. Furthermore, a metallic incandescent filament is free from the migration phenomenon at those current densities at which the filament is intended to be operated. Consequently, the long-term stability of a metallic incandescent filament is appreciably better than that of an incandescent filament made from boron- or phosphorus-doped polysilicon.

The resistance temperature coefficient of a metallic incandescent filament is positive over its entire operating range, whereby the incandescent filaments can be connected in parallel and fed from a voltage source.

The nitride encapsulation used in the manufacturing method according to the invention assures a long service life for the radiant source.

BRIEF DESCRIPTION OF THE DRAWINGS

The invention is next examined in greater detail with the help of exemplifying embodiments illustrated in the appended drawings, in which

FIG. 1b is section 1b—1b of the radiant source illustrated in FIG. 1a;

FIG. 2b is section 2b—2b of the radiant source illustrated in FIG. 2a;

DETAILED DESCRIPTION OF THE PREFERRED EMBODIMENTS

One intended use of the present invention is in optical analysis as a thermal radiant source electrically modulatable at a high rate. Furthermore, the deposition of the required thin-film layers discussed below can be made using conventional standard processes of microelectronics such as described in S. M. Sze, "VLSI technology," McGraw-Hill Book Company, 3rd printing, 1985, Chapters 5 and 6.

Figure 1A:
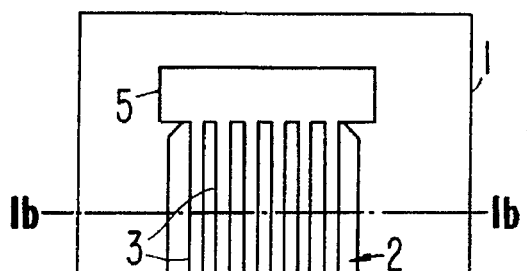
FIG. 1a is a top view of a radiant source according to the invention.
Figure 1B:
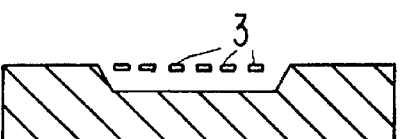

Referring to FIGS. 1a and 1b as well as 2a and 2b, the structure of a radiant source is shown having multiple incandescent filaments electrically connected in parallel.

Figure 2A:
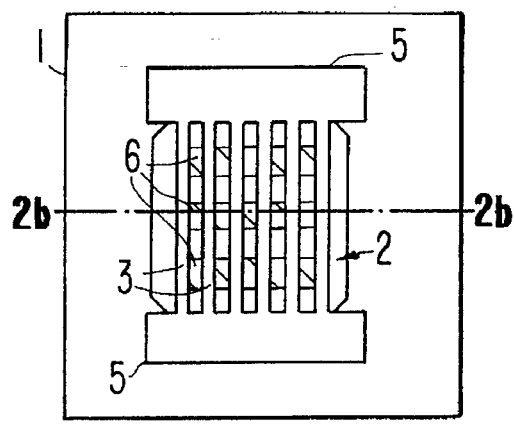
FIG. 2a is a top view of another radiant source according to the invention.
Figure 2B:
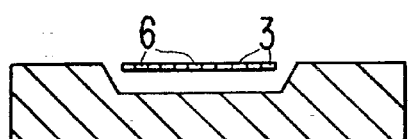

Now referring to FIGS. 1a–1b, the large square 1 is a monocrystalline silicon chip, the smaller square 2 with bevelled corners is a well located below incandescent filaments 3, and the oblique-hatched area 6 marked in FIGS. 2a and 2b is a nitride layer. The incandescent filaments 3 have metallizations 5 at their ends. The incandescent filaments 3 are connected in parallel and the external electrical connections are taken to the metallizations 5. In the embodiment of FIGS. 1a and 1b the filaments 3 are shown separated from each other over their entire length. FIGS. 2a and 2b illustrate an improved structure in which the incandescent filaments 3 are mechanically interconnected by a silicon nitride bridge 6. The openings in the nitride bridge are necessary to provide easier exit of the gas formed during etching from under the incandescent filaments. This arrangement improves the etching result. Such openings are unnecessary if the etching rate is kept low.

The emitting area can be, e.g., 1 $mm^2$. The incandescent filaments 3 are floating in the air for their entire length supported only at their ends. The silicon 1 under the filaments 3 is etched away for a depth of at least 10 μm, while a 100 μm etching depth is typical. The ends of the filaments 3 are connected in parallel by means of the metallized pads 5, respectively placed at each end. The dimensions of the filaments 3 can be, e.g., thickness 1 μm by width 20 μm by length 1 mm, and a spacing of 5 μm between the filaments. The filaments 3 are heated by the current flowing via them. The required input voltage is from one volt to a few volts.

According to the invention, metallic incandescent filaments 3 are entirely encapsulated in silicon nitride, whereby the oxidation rate of the nitride determines the service life of the filament 3. If the radiant source is used at a temperature below 800° C. in normal room air, its service life is several years. No special hermetic vacuum encapsulation with the necessary output window is required.

The underetching of the nitrified incandescent filaments 3 can be carried out in an aqueous solution of KOH. The etchant used can also be tetramethylammonium hydroxide, or alternatively, an aqueous solution of ethylenediamine with a small amount of pyrocatechol added.

As the incandescent filaments 3 operate without a superimposed window, any organic contamination falling on the filament 3 is burnt off. If the radiant source is operated in a pulsed mode, the air under the incandescent filaments heats up rapidly and blows any entrapped dust away. Accordingly, the embodiment according to the invention incorporates an inherent self-cleaning mechanism.

The crosswise temperature distribution of the incandescent filament 3 can be tuned by varying the design geometry. An even temperature distribution is attained by having the filament width at 20 µm or narrower. The crosswise temperature distribution can further be improved by thermally interconnecting the filaments 3 by means of, e.g., the silicon nitride bridge 6.

Figure 3:
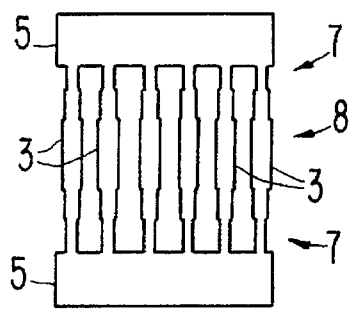
FIG. 3 is a diagram illustrating an alternative geometry according to the invention for the incandescent filaments shown in the diagrams of FIGS. 1a–2b.

Now referring to FIG. 3, the lateral temperature profile of the incandescent filaments 3 may be improved by tapering the ends 7 of the filaments 3, whereby the electrical resistance per unit length at the tapered end areas 7 increases thus concentrating a greater heating power at these areas. Increasing the heating power per unit length at the ends of the filaments is necessary, because the ends 7 of the filaments 3 tend to cool more rapidly as heat is conducted from the ends 7 of the filaments 3 to the substrate. By virtue of the tapered filament ends 7, the center portion 8 of the filament 3 will be approximately at the same temperature with the filament ends 7, whereby the effective emitting surface of the radiant source is increased. The ends 7 of the filaments 3 thus tapered reach a higher temperature than the ends of the constant-width filaments illustrated in FIGS. 1a–2b. The tapering geometry may be stepped, or alternatively, the ends may be tapered in a continuous fashion without steps.

The maximum usable modulation rate of the radiant source is dependent on the proportion of thermal losses. The majority of such losses occurs via the air layer below the filaments 3 and via the filament ends to the silicon substrate. As the proportion of radiant losses in the total loss is a few percent, the temperature of the incandescent filament 3 is an almost linear function of the input power. The operation temperature of the filaments is typically above 400° C. and in an advantageous implementation above 500° C. The maximum rate of modulation can best be tuned by varying the depth of the well 2 under the filaments 3. The depth of the well 2 is appropriately 50–300 µm. With the structure described herein, a thermal time constant of approx. 1 ms can be attained permitting electrical modulation up to approx. 1 kHz.

Figure 4:
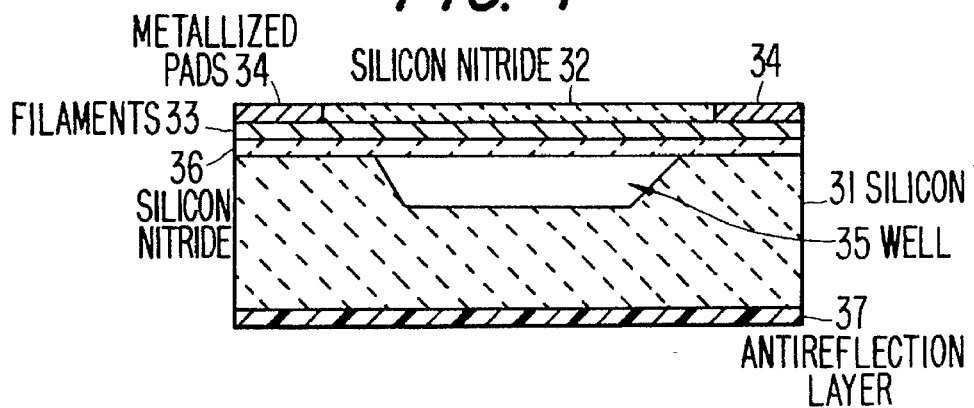
FIG. 4 is a longitudinally sectional side view of the layered structure of a radiant source according to the invention complemented with an antireflection layer.

With reference to FIG. 4, the layered structure of the radiant source is shown in greater detail. In the embodiment shown therein, the emitted radiation is directed downward through an antireflection layer 37. Area 31 is typically formed by a substrate chip of (100)-oriented monocrystalline silicon having a typically 200 nm thick silicon nitride layer 36 deposited on it. The nitride layer 36 is required to isolate the incandescent filaments from the conducting substrate 31 and simultaneously it functions as a lower protective layer for the incandescent filaments 33. Onto the surface of the nitride layer 36 is deposited a typically 0.5 µm thick metallic layer 33 which is patterned into the incandescent filaments by means of photolithography and plasma etching techniques used in microelectronics manufacture. Next, an upper silicon nitride layer 32 is deposited, whereby the incandescent filaments patterned from the metallic layer 33 become entirely encapsulated within a nitride layer. The upper nitride layer 32 is typically 200 nm thick. Means for feeding the input voltage comprise metallized pads 34, which can be made of aluminum, for example. These pads form ohmic contacts with the metallic incandescent filaments 33 via openings made into the upper nitride layer 32 by means of, e.g., plasma etching. The monocrystalline silicon forming the substrate 31 is finally etched away from under the filament, whereby a well 35 is formed. This etching step occurs via openings made between the filaments and at the side of the outermost filaments. The layer 37 is a thin antireflection layer made from, e.g., silicon nitride. The thickness of this $\lambda/4$ layer may be, e.g., 400–500 nm, depending on the desired operating wavelength.

The emissivity of the filaments 33 is typically greater than 0.4, in an advantageous implementation greater than 0.5 and in an especially advantageous implementation greater than 0.7.

Figure 5:
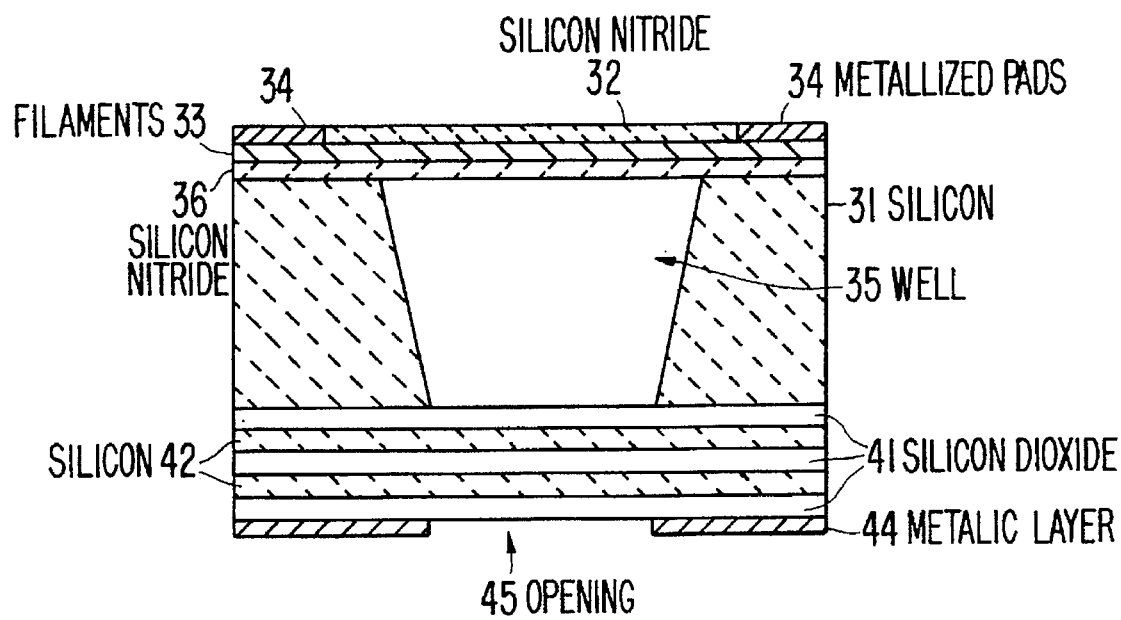
FIG. 5 is a longitudinally sectional side view of a radiant source according to the invention complemented with an integral optical filter and aperture.

The emission spectrum of the radiant source may also be filtered by means of a Fabry-Perot interference filter illustrated in FIG. 5 which may be fabricated onto the lower surface of the silicon substrate 31. This arrangement provides the benefit that the radiant source does not emit at any unnecessary wavelengths, which results in an improved signal-to-noise ratio. The interference filter is formed by $\lambda/4$ layers 41 of silicon dioxide and $\lambda/4$ layers 42 of silicon. The center layer 41 is a $\lambda/2$ layer. The aperture of the radiant source is formed by a metallic layer 44 having an opening 45. The thickness of the metallic layer 44 is typically 100 nm.

Figure 7:
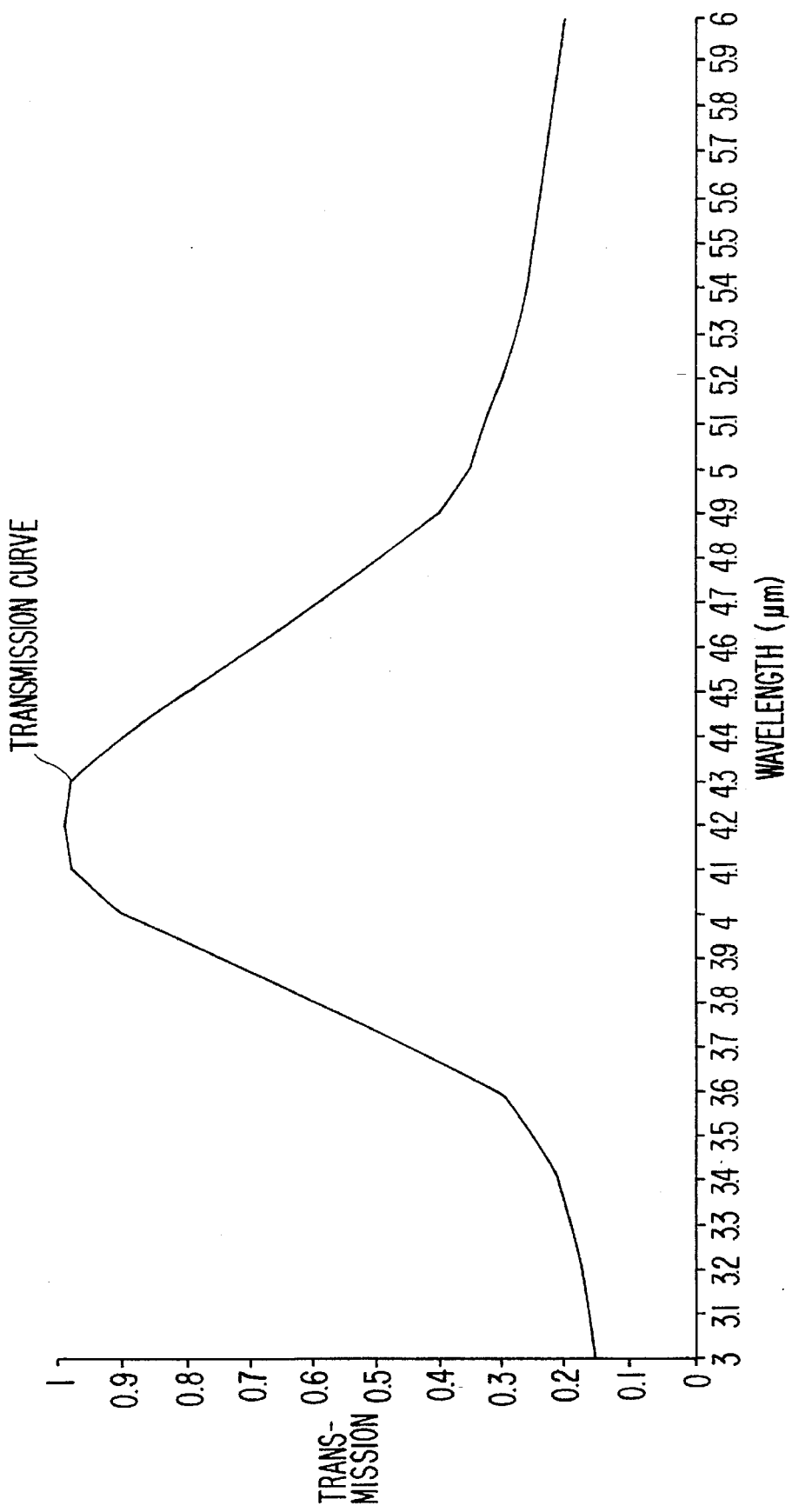
FIG. 7 is a graph illustrating the transmission characteristics of the filter used in the radiant source shown in FIG. 5.

Referring to FIG. 7, a graph is shown illustrating the transmission characteristics of the above-described filter. The shape of the transmission curve is determined by the number of reflective layers in the interference filter. The larger the number of layers, the narrower the passband.

Figure 6:
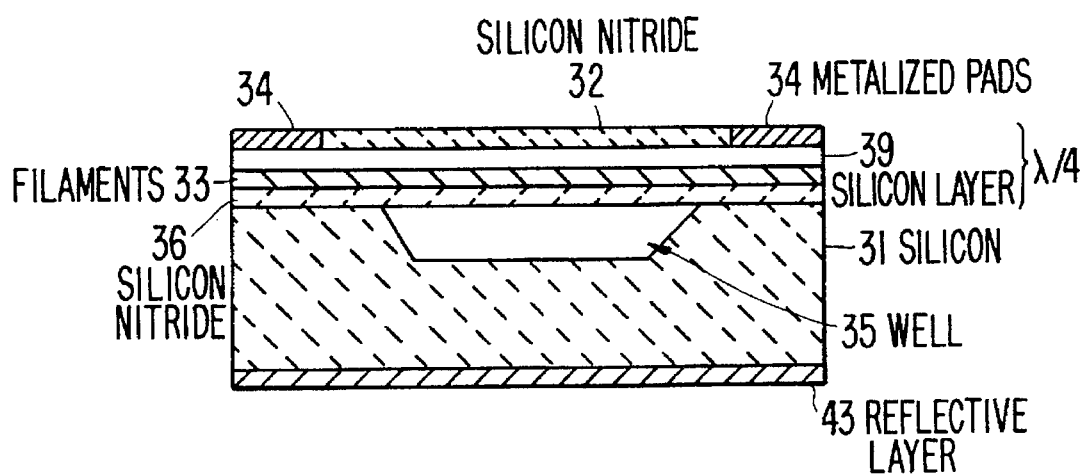
FIG. 6 is a longitudinally sectional side view of a radiant source according to the invention complemented with an emission-improving layer.

The emissivity of a tungsten filament decreases rapidly at wavelengths greater than three micrometers. Such decrease of emissivity at longer wavelengths can be compensated for by coating the metallic layer with polycrystalline silicon 39 as shown in FIG. 6. In the embodiment illustrated in FIG. 6, the glowing metal filament 33 heats the polycrystalline silicon 39, which thus acts as the radiant source. The thickness of the silicon layer 39 may typically be in the range 100–1000 nm. The spectrum of the emitted radiation is also affected by interferences within the silicon nitride layers 32 and the emission-improving polysilicon layers 39 deposited onto the metallic layer 33. The emitted spectrum has a pronounced tendency to form peaks at such wavelengths on which the polysilicon layer 39 and the nitride layer 32 deposited thereonto have a combined thickness equal to the optical quarter-wavelength in the layers. To improve the emission output, the structure further has a reflective layer 43 deposited on the lower surface of the substrate 31, whereby the reflective layer 43 is in practice fabricated as a metallic layer with a thickness of 50–100 nm.

Figure 8:
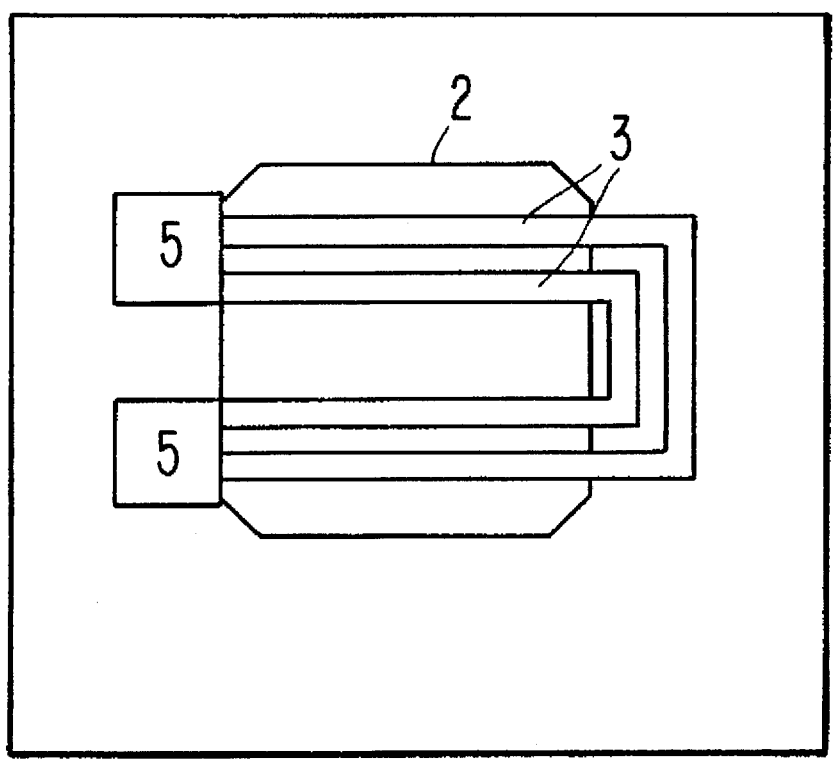
FIG. 8 is a top view of a radiant source according to the present invention having filaments arranged in series and parallel.

Without departing from the scope and spirit of the invention, the incandescent filaments can alternatively be connected, e.g., pairwise in series by placing the two input voltage feed pads on one side of the substrate well, while each adjacent pair of the incandescent filaments is then electrically connected in series by joining their other ends on the other side of the well as shown in FIG. 8.

Further, the well under the filaments can be replaced within the scope of the invention by a hole extending through the substrate.

Alternative substrate materials with dielectric properties are alumina, sapphire, quartz and quartz glass.

Instead of silicon nitride, also thin films made from aluminium oxide or silicon oxide can be used for coating the incandescent filaments 3.

The term emission is here used to refer to radiation emission and especially infrared emission.

We claim:

1. An electrically modulatable radiant source, comprising:

an essentially planar substrate;

a well or hole formed into the substrate;

at least one incandescent filament attached to the substrate, said incandescent filament being aligned at said well or hole, said incandescent filament being formed from a metallic compound which readily oxidizes at an operating temperature of said incandescent filament;

an oxidation resistant film encapsulating said incandescent filament to prevent said filament from oxidizing; and contact pads formed onto the substrate at both ends of the incandescent filament for feeding electric current to the incandescent filament.

2. A radiant source as defined in claim 1, wherein said oxidation resistant film is silicon nitride.

3. A radiant source as defined in claim 1, wherein there are at least two incandescent filaments which are electrically connected in series.

4. A radiant source as defined in claim 1, wherein there are at least two incandescent filaments which are electrically connected in parallel.

5. A radiant source as defined in claim 1, wherein there are a plurality of incandescent filaments, and a number of the incandescent filaments are electrically connected both in parallel and in series.

6. A radiant source as defined in claim 1, wherein each of the incandescent filaments are made of tungsten.

7. A radiant source as defined in claim 1, wherein each of the incandescent filaments are made of a titanium-tungsten alloy.

8. A radiant source as defined in claim 1, wherein each of the incandescent filaments are made of molybdenum.

9. A radiant source as defined in claim 1, wherein there are a plurality of incandescent filaments which are mechanically connected to each other.

10. A radiant source as defined in claim 9, wherein the incandescent filaments are mechanically connected to teach other by a continuous silicon nitride bridge.

11. A radiant source as defined in claim 9, wherein the incandescent filaments are mechanically connected to each other by a continuous silicon nitride bridge having openings therein.

12. A radiant source as defined in claim 1, further comprising a reflective layer disposed only under the incandescent filaments.

13. A radiant source as defined in claim 1, further comprising an antireflection layer disposed under the incandescent filaments.

14. A radiant source as defined in claim 1, further comprising a Fabry-Perot interferometer disposed under said incandescent filaments.

15. A radiant source as defined in claim 1, further comprising a nontransparent layer having an aperture formed therein disposed under said incandescent filaments and said substrate.

16. A radiant source as defined in claim 1, further comprising an emission-improving film partially coating said incandescent filaments.

17. A radiant source as defined in claim 16, wherein said emission-improving film and said oxidation resistant film have a combined thickness equal to the quarter-wave of a measurement wavelength.

18. A radiant source as defined in claim 16, wherein said emission-improving film is a polysilicon film.

19. A radiant source as defined in claim 1, wherein the ends of the incandescent filaments are shaped thinner than center portions of the incandescent filaments.

20. A radiant source as defined in claim 19, wherein each of the incandescent filaments is tapered in a stepwise manner from the center portion to the ends.

21. A radiant source as defined in claim 1, wherein an emissivity of the incandescent filaments is greater than 0.4.

22. A radiant source as defined in claim 1, wherein the operating temperature of the incandescent filaments is greater than 400° C.

23. A radiant source as defined in claim 1, wherein an emissivity of the incandescent filaments is greater than 0.5.

24. A radiant source as defined in claim 1, wherein an emissivity of the incandescent filaments is greater than 0.7.

25. A radiant source as defined in claim 1, wherein the operating temperature of the incandescent filaments is greater than 500° C.

* * * * *